United States Patent [19]
Jullig

[11] 3,815,946

[45] June 11, 1974

[54] ENERGY-ABSORBING BUMPER BAR ARRANGEMENT FOR MOTOR VEHICLES

[75] Inventor: Karl Jullig, Walldorf, Germany

[73] Assignee: General Motors Corporation, Detroit, Mich.

[22] Filed: May 14, 1973

[21] Appl. No.: 359,716

[30] Foreign Application Priority Data
May 27, 1972 Germany............................ 2225880

[52] U.S. Cl..................................... 293/99, 293/70
[51] Int. Cl............................................. B60r 19/08
[58] Field of Search............ 293/70, 85, 86, 89, 98, 293/99; 308/2 R; 85/50; 248/205 R; 52/167, 263

[56] References Cited
UNITED STATES PATENTS

| | | | |
|---|---|---|---|
| 3,323,842 | 6/1967 | Hanson............................... | 308/2 R |
| 3,482,653 | 12/1969 | Shinmaki et al...................... | 293/89 |
| 3,754,786 | 8/1973 | Heinig et al. ......................... | 293/99 |

FOREIGN PATENTS OR APPLICATIONS

| | | | |
|---|---|---|---|
| 1,092,487 | 4/1955 | France................................. | 85/50 R |

*Primary Examiner*—M. Henson Wood, Jr.
*Assistant Examiner*—Robert Saifer
*Attorney, Agent, or Firm*—S. Schwartz

[57] ABSTRACT

A resilient connection for attaching one end of a frame mounted energy absorbing support unit telescopeable longitudinally to a transverse and vertically oriented channel section of a collision bumper assembly, the connection including a plate rigidly disposed on the end of the energy absorbing unit and defining a transverse surface flanked by a pair of beveled surfaces, registered mounting apertures in the plate transverse surface and in the channel section for receiving therethrough attaching bolts and spring washers disposed between one surface of the channel section and a head on each bolt and between one surface of the plate and a nut disposed on each bolt. The mounting apertures are situated vertically eccentric with respect to the longitudinal axis of the support unit so that the height of the attached bumper above the pavement can be altered by inverting the support unit.

9 Claims, 9 Drawing Figures

PATENTED JUN 11 1974          3,815,946

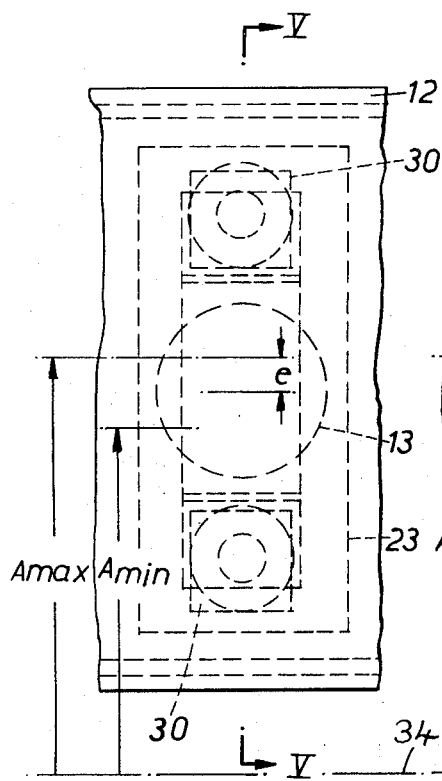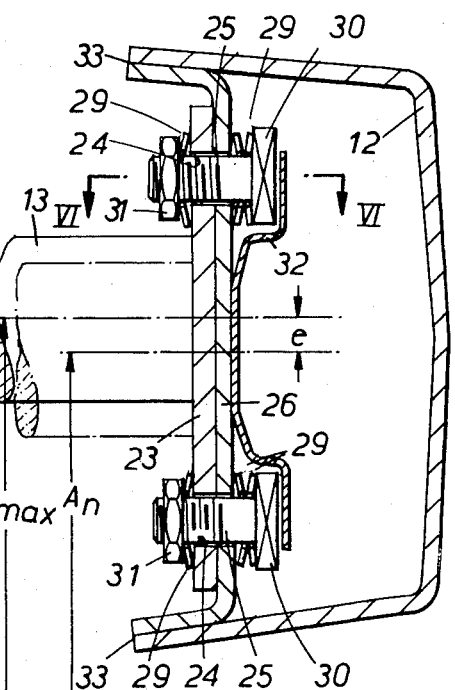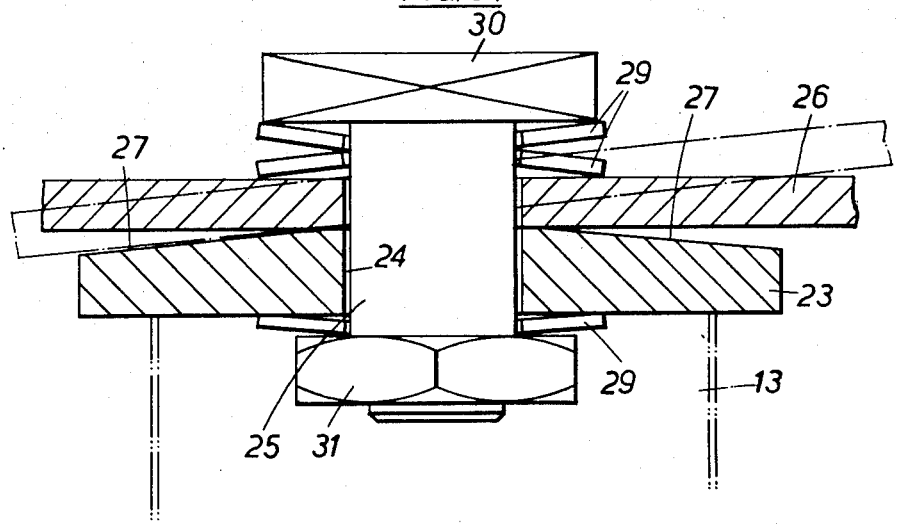

ENERGY-ABSORBING BUMPER BAR ARRANGEMENT FOR MOTOR VEHICLES

This invention relates generally to energy-absorbing bumper bar arrangements for motor vehicles, and, in particular, to energy-absorbing bumper bar arrangements in which the bumper bar is supported upon a pair of energy-absorbing units aligned substantially parallel to the longitudinal axis of the motor vehicle and secured to the base of said vehicle adjacent either the forward or rearward end of the vehicle.

Energy-absorbing bumper bar arrangements of this type can suffer from the disadvantage that the movement of the bumper bar produced during the absorption of energy of an impact force exerted on the bumper bar results in the bumper bar coming into contact with the bodywork of the vehicle and causing damage to it. Such a disadvantage is pronounced if the bumper bar is mounted on the energy-absorbing units in a manner which results in parts of the assembly, such as the ends of fixing bolts, being positioned relatively close to the bodywork of the vehicle, since displacement of the bumper bar under impact is likely to result in localised denting, if not rupturing, of the vehicle bodywork adjacent said parts of the assembly.

For a motor vehicle having a base incorporating two beam members, each of which extends longitudinally of the vehicle substantially parallel to the longitudinal axis of said vehicle, an energy-absorbing bumper bar arrangement according to the invention includes a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising an open-ended guide tube secured in parallel relationship with each longitudinal beam member adjacent an end thereof, with the open end of said guide tube adjoining said end of the respective longitudinal beam member, and a shock-absorber means movably mounted within each guide tube substantially parallel to the respective longitudinal beam member; flange means situated at the end of each shock-absorber means remote from the guide tube; and resiliently-mounted connection means securing each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member. Preferably the resiliently-mounted connection means mounted on the inner channel-section member include fixing bolts encircled by compression spring elements in the form of spring plates, and said fixing bolts are retained in apertures in the inner channel-section member by means of a retainer plate inside the bumper bar secured to the inner channel-section member so as to overlie the heads of the fixing bolts and to prevent said fixing bolts from rotation as the bumper bar is being attached to the flange means.

The energy-absorbing bumper bar arrangement according to the invention is capable of tilting slightly on the vehicle body in response to an impact force applied off-center to the longitudinal axis of the vehicle body by reason of the resiliently-mounted connection means between the bumper bar and the respective flange means of the energy-absorbing units. To improve the tilt characteristics of the bumper bar on the respective flange means, each of the flange means has a face remote from its respective shock-absorber means which comprises a narrow flat central portion adjoined by laterally-bevelled wing portions extending therefrom, and the fixing bolts of the resiliently-mounted connection means pass through apertures in said narrow flat central portion so as to hold this portion in contact with a zone of said inner channel-section member extending at right angles to the longitudinal axis of said inner channel-section member. By this arrangement it is possible to ensure that the tilting of the bumper under such an off-centre impact force occurs substantially at the center portion of each flange means rather than at the outer edge of said flange means.

In a preferred embodiment of the invention, each flange means is elongated and the apertures in the narrow flat central portion thereof have their centers lying on a circle whose centre is located at a point on said flange means which is asymmetrically placed at a distance from the point at which the longitudinal axis of the shock-absorber means intersects said flange means. Such an arrangement affords a useful way of reducing the tolerance in bumper bar height produced from vehicle to vehicle during manufacture of said vehicles. During manufacture of motor vehicles, the vehicles are customarily conveyed to a bumper bar assembly point, at which point the bumper bars are secured at either end of the vehicle. It is found in practice that a variation exists in the distance between the longitudinal axis of the guide tubes of the vehicle and the ground, from vehicle to vehicle on the assembly line at this point, particularly if the vehicles are equipped with different components (e.g., automatic transmissions instead of manual gearboxes). It is desirable, and in some countries it is required by regulation, that the bumper bars of motor vehicles should be located on the vehicles at a certain height from the ground. One way of meeting such a requirement is to make bumper bars of sufficient height to compensate for the aforesaid variation, but this is not necessary in the preferred embodiment of the invention, since the eccentricity in the position of the apertures of each flange means relative to the corresponding shock-absorber means can be utilised to compensate to a considerable extent the effect of the aforesaid variation on the bumper bar height. Thus, if the distance from the guide tubes of the vehicle to the ground is too great, the shock-absorber means are mounted in the guide tubes in such a way that the longer parts of the corresponding flange means point towards the ground. In this way, the longitudinal axis of the bumper bar is located closer to the ground than are the longitudinal axes of the guide tubes. Conversely, if the distance from the guide tubes of the vehicle to the ground is too small, the shock-absorber means are mounted in the guide tubes in such a way that the longer parts of the corresponding flange means point away from the ground, so as to locate the longitudinal axis of the bumper bar further from the ground than the longitudinal axes of the guide tubes.

An object of this invention is to provide an energy-absorbing bumper bar arrangement for a motor vehicle in which the chances of body damage of the vehicle occurring through movement of the bumper bar towards the body of the vehicle are minimised. A more specific object is to additionally provide an energy-absorbing bumper bar arrangement that can tilt to a predetermined degree under the impact of an off-center force without jamming of the movement of the energy-absorbing units. A further object is to also provide an energy-absorbing bumper bar arrangement which incorporates a means of compensating for the possible variation in bumper height obtainable from vehicle to vehicle during the manufacture of said vehicles.

These and other objects of the invention will be readily apparent from the following specification and drawings in which:

FIG. 4 shows a partial view of the arrangement of FIG. 1 taken in the direction B in FIG. 1;

FIG. 5 shows a partial section of the arrangement of FIG. 1 taken along the line V—V indicated in FIG. 4 and in FIG. 1;

FIG. 6 shows an enlarged partial section of a detail of FIG. 5, taken along the line V1—V1 in FIG. 5;

Figure 1:
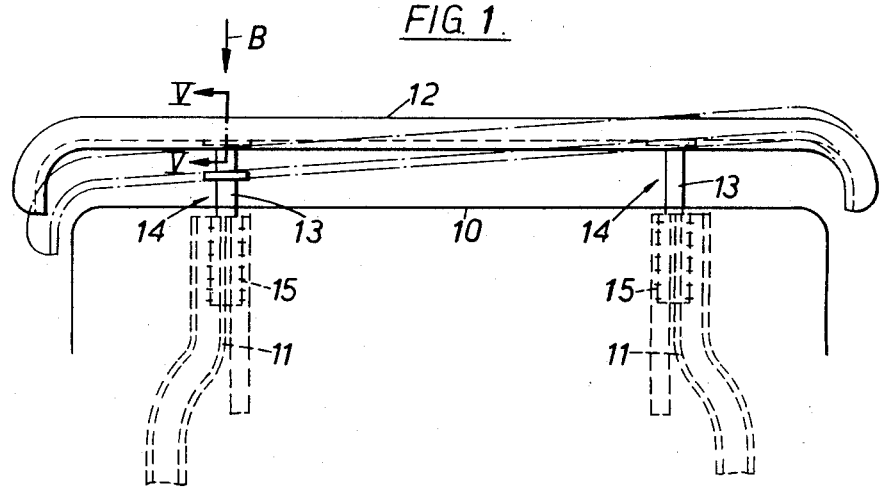
FIG. 1 shows a partial top view of a motor vehicle having an energy-absorbing bumper bar arrangement according to the invention.

In FIG. 1 the forward end of a motor vehicle 10 is shown schematically in outline, there being shown in broken lines the outlines of two longitudinal beam members 11, to each one of which is secured, as by welding, a guide tube 15 housing an energy-absorbing unit 14. Alternatively, each guide tube 15 may be provided with flanges, and may be secured to the respective beam member by fixing bolts. The two energy-absorbing units 14 are connected to a bumper bar 12 to form an energy-absorbing bumper bar arrangement in a manner which will be described in detail hereinafter.

Figure 2:
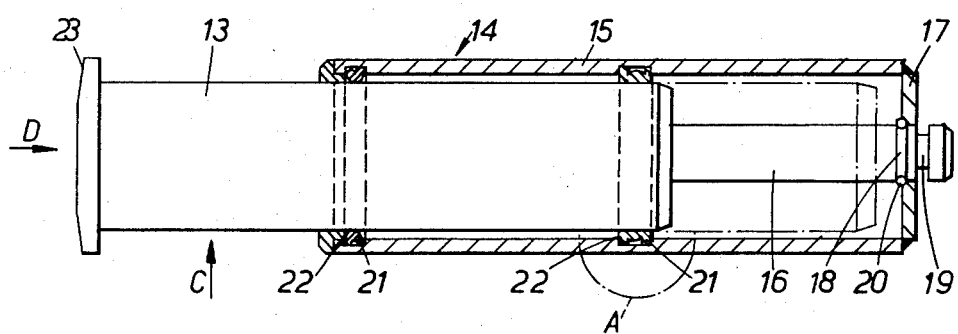
FIG. 2 shows a plan view, partially in section, of one of the energy-absorbing units of the arrangement of FIG. 1.
Figure 3:
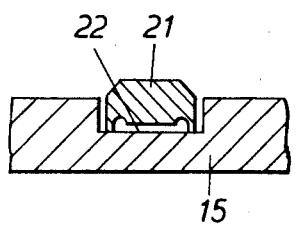
FIG. 3 shows an enlarged view of a detail of FIG. 2 indicated at A in FIG. 2.
Figure 7:
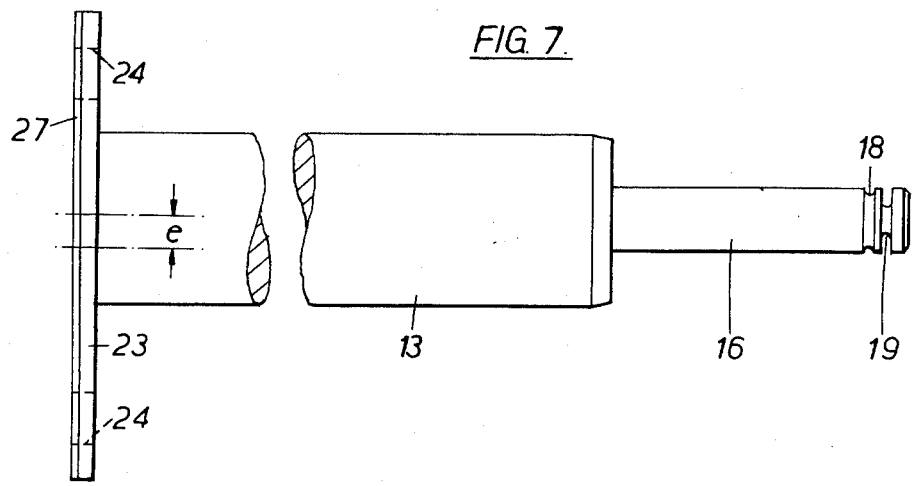
FIG. 7 shows the energy-absorbing unit illustrated in FIG. 2, looking in the direction of the arrow C in FIG. 2.

The design of the energy-absorbing unit 14 can be seen in more detail in FIG. 2, and comprises a hydraulic shock-absorber 13 having its outer casing movably mounted within the respective guide tube 15, and a piston rod 16 having its free end located within an aperture in an end wall 17 of the guide tube 15. Two annular grooves 18 and 19 are formed in the free end of the piston rod 16 into which grooves are inserted respectively a ring of wire 20 and an arcuate clip (not shown) to anchor said free end within the aperture in end wall 17. Two resilient guide rings 21, made of a suitable plastics material, are seated in annular grooves 22 in the guide tube 15 to guide the axial movement of the shock-absorber 13 within the guide tube 15. The cross-sectional shape of these guide rings 21, as shown in FIG. 3, also allow a predetermined limited amount of radial movement of the shock-absorber 13 in the guide tube 15. Thus these guide rings 21 have an increased radial spring action, so that tolerances in the diameters of the shock-absorber 13 and the guide tube 15, and any distortion of the guide tube 15 which occurs during welding of the guide tube to its respective beam member 11, can be taken up without any risk of the shock-absorber 13 jamming in guide tube 15 when the bumper bar 12 is subjected to an impact force.

Figure 9:
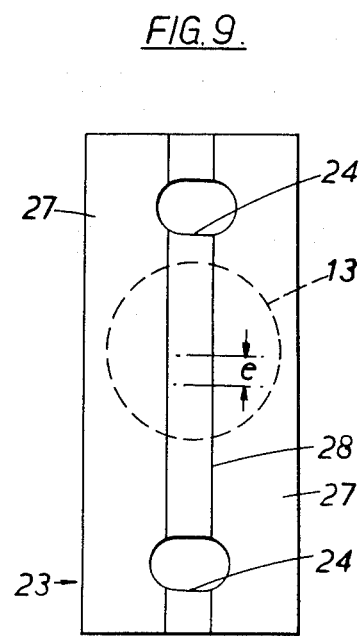
FIG. 9 shows a view of the end of the energy-absorbing unit of FIG. 2 as seen in the direction of the arrow D in FIG. 2.

A flange 23, shown in detail in FIG. 9 and also in FIGS. 2, 4, 5 and 7 is secured to the forward end of the outer casing of the shock absorber 13 with the intersection point of its longitudinal and lateral axes eccentric to the axis of the shock-absorber 13, the extent of this predetermined eccentricity being denoted by "e" in FIGS, 4, 5, 7 and 9. As can be seen from FIG. 9, the flange 23 has two symmetrically placed apertures 24 therein, which accomodate fixing bolts 25, as shown in FIGS. 5 and 6. The bumper bar 12 is a composite substantially box-section member comprising an outer channel-section member and an inner channel-section member, or inner support surface, 26 nested within said outer channel-section member, the peripheral edges 33 of said support surface and said outer member being secured together, as by welding. The inner support surface 26 has two pairs of apertures therein, each pair of apertures being alignable with the corresponding apertures 24 in the flange 23 of one of the energy-absorbing units 14, so that the bumper bar 12 can be secured to the energy-absorbing units 14 by means of the fixing bolts 25 with the inner support surface 26 in immediate contact with the flanges 23 of the energy-absorbing units 14.

Figure 8:
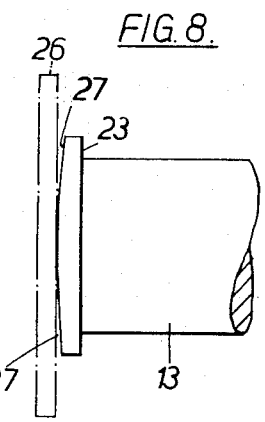
FIG. 8 shows a partial view of the energy-absorbing unit of FIG. 2, indicating schematically the position of an inner support surface of the bumper bar relative to a flanged end of the energy absorbing unit.

As can be seen in more detail in FIG. 6, the forward face of the flange 23 on each energy-absorbing unit is provided with a laterally extending bevelled surface 27 extending from each side of a narrow flat portion 28 (see FIG. 9), in which flat portion the apertures 24 are situated. Consequently, as can be seen in FIGS. 6 and 8, the flange 23 makes contact with the inner support surface 26 over the relatively small area of flat portion 28. As shown in FIG. 6, each fixing bolt 25 has a flat flanged head 30 and is engaged with a lock nut 31, there being interposed between the flanged head 30 and the inner support surface 26 two cup-shaped spring washers 29, one of which bears on the flanged head 30 and the other of which bears on the inner support surface 26; and there being interposed between the flange 23 and the lock nut 31 a third cup-shaped spring washer 29, which bears on the flange 23. Thus the inner support surface 26 is mounted upon each flange 23 by means of a pair of spring-loaded mountings, each of which comprises the combination of the fixing bolt 25, the lock nut 31, and the spring washers 29 as shown in FIG. 6. A bent backing plate 32 (see FIG. 5) is mounted on the inner support surface 26 so that the bent portions of the plate 32 cover a substantial portion of the flanged heads 30 of the fixing bolts 25 and prevent any possibility of the fixing bolts from falling within the interior of the bumper bar 12 before the bumper bar 12 is attached to the respective flanges 23. Moreover, the presence of the backing plate 32 serves to anchor the fixing bolts 25 against turning whilst the respective lock nuts are being threaded upon them and tightened up.

If the motor vehicle 10 shown in FIG. 1 is involved in a collision which involves a load being imposed on the bumper bar 12 substantially in a direction along the longitudinal axis of the vehicle, both of the shock-absorbers 13 are forced inwards in their respective guide tubes 15 to cushion the effect of this load on the vehicle 10. By having the bumper bar 12 mounted upon these shock absorbers 13 by means of an inner support surface 26 secured to the flanges 23 of the shock-absorbers 13 by a plurality of spring-loaded mountings in which the majority of the cup-shaped spring washers therein are situated within the bumper bar 12, the portions of the fixing bolts 25 protruding from the flanges 23 are reduced to a minimum. This, in turn, means that, in the event that the collision is of such a magnitude that the shock-absorbers 13 are forced right into their respective guide tubes, there is no risk of the ends of the fixing bolts 25 protruding from the respective flanges 23 coming into contact with the vehicle body before the rear edges 33 of the bumper bar (see FIG. 5) come into contact with the vehicle body. Thus, in such an event, the chances of substantial localised denting and distortion of the vehicle bodywork in the vicinity of the bumper bar mountings are much diminished.

In the event that the bumper bar 12 is struck at a point off-center from the longitudinal axis of the vehicle the bumper bar 12 deflects as shown by the broken outline in FIG. 1. This deflection of the bumper bar 12 is facilitated by the spring loaded mountings and the bevelled surfaces 27 of the flanges 23, which, in combination, allow a predetermined degree of tilt of the inner support surface 26 relative to the flanges 23 to occur. Movement of the respective shock absorber 13 (i.e. the left-hand shock-absorber as seen in FIG. 1) within its guide tube 15 to absorb the impact can still occur without jamming, despite the off-centre nature of the impact, by reason of the resilient guide rings 21 between the shock absorber 13 and the guide tube 15, which allow the aforesaid limited amount of radial movement to occur between the shock-absorber 13 and the guide tube 15.

By means of the built-in eccentricity of each flange 23 in relation to its respective shock-absorber 13, tolerances in the distance between the ground and the longitudinal axis of the guide tube 15 of the vehicle 10 which occur from vehicle to vehicle on the assembly line during manufacture can be compensated for to avoid materially altering the height of the bumper bar 12 from the ground 34 from vehicle to vehicle. To achieve this tolerance compensation, when the distance between the ground 34 and the axis of the guide tube 15 is too great, the shock-absorber 13 is inserted into the guide tube 15 in such a way that the longer part of the flange 23 is pointing towards the ground 34, as shown in FIGS. 4 and 5. As a result the longitudinal axis of the bumper bar 12 is positioned closer to the ground 34 than is the axis of the guide tube 15. Conversely, if the distance between the ground 34 and the axis of the guide tube is too small, the shock-absorber 13 is inserted into the guide tube 15 in such a way that the longer part of the flange 23 is pointing away from the ground 34. As a result the longitudinal axis of the bumper bar 12 is positioned further from the ground 34 than is the axis of the guide tube 15. The maximum and minimum distances of the axis of the guide tube 15 from the ground 34 are shown respectively in FIG. 4 as $A_{max}$ and $A_{min}$, and the normal distance of the axis of the guide tube 15 from the ground 34 is shown as $A_n$ in FIG. 5. With a knowledge of the tolerances to be expected during assembly, i.e. the distance represented by $A_{max} - A_{min}$, the amount of eccentricity e can be determined to ensure that the bumper bar height obtained on a succession of vehicles can be maintained in the region of $A_n$ by the appropriate insertion of the shock-absorbers 13 with the longer parts of the flanges 23 pointing towards or away from the ground 34. Thus, for example, if $A_{max} - A_{min}$ is four inches, then the predetermined eccentricity e would be one inch, and the bumper bar height of successive vehicles would be maintained in the region of ± 1 inch of $A_n$.

Thus this invention provides an improved energy-absorbing bumper bar arrangement for a motor vehicle.

I claim:

1. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising an open-ended guide tube secured in parallel relationship with each longitudinal beam member adjacent an end thereof, with the open end of said guide tube adjoining said end of the respective longitudinal beam member, and a shock-absorber means movably mounted within each guide tube substantially parallel to the respective longitudinal beam member; flange means situated at the end of each shock-absorber means remote from the guide tube; and resiliently-mounted connection means securing each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member.

2. An energy-absorbing bumper bar arrangement according to claim 1, in which the resiliently-mounted connection means includes compression spring elements in the form of spring plates.

3. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising an open-ended guide tube secured in parallel relationship with each longitudinal beam member adjacent an end thereof, with the open end of said guide tube adjoining said end of the respective longitudinal beam member, and a shock-absorber means movably mounted within each guide tube substantially parallel to the respective longitudinal beam member; flange means situated at the end of each shock-absorber means remote from the guide tube; resiliently-mounted connection means mounted on the inner channel-section member securing each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member; and retainer plate means inside the bumper bar secured to the inner channel-section member to retain said connection means in position on the inner channel-section member before each flange means is secured to said inner channel-section member.

4. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising an open-ended guide tube secured in parallel relationship with each longitudinal beam member adjacent an end thereof, with the open end of said guide tube adjoining said end of the respective longitudinal beam member, and a shock-absorber means movably mounted within each guide tube substantially parallel to the respective longitudinal beam member; flange means mounted on the end of each shock-absorber means remote from the guide tube, and having a face remote from the shock-absorber means which comprises a narrow, flat central portion adjoined by laterally-bevelled wing portions extending therefrom; and resiliently-mounted connection means securing each flange means to said inner channel-section member with the central portion of said face of the flange means in contact with a zone of said inner channel-section member extending at right angles to the longitudinal axis of said inner channel-section member, at least the major portion of each of said resiliently-mounted connection means being located inside the bumper bar between the outer channel-section member and the inner channel-section member.

5. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising an open-ended guide tube secured in parallel relationship with each longitudinal beam member adjacent an end thereof, with the open end of said guide tube adjoining said end of the respective longitudinal beam member, and a shock-absorber means movably mounted within each guide tube substantially parallel to the respective longitudinal beam member; elongated flange means mounted on the end of each shock-absorber means remote from the guide tube, and having apertures therethrough, the centers of which lie on a circle whose centre is located at a point on the flange means which is asymmetrically placed at a distance from the point at which the longitudinal axis of the shock-absorber means intersects said flange means; and resiliently-mounted connection means on said inner channel-section member which pass through said apertures in each flange means so as to secure each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member.

6. An energy-absorbing bumper bar arrangement according to claim 5, in which said distance is so chosen with respect to the manufacturing tolerances in the distance of said longitudinal axis of the shock-absorber means from the ground that it is possible to reduce the corresponding tolerance in the distance of the bumper bar from the ground by selecting that one of the two possible positions of the flange means relative to the bumper bar in which said distance will reduce said corresponding tolerance.

7. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising two guide tubes each of which has an open end and a closed end, and is secured in parallel relationship with one of the longitudinal beam members adjacent an end thereof, with the open end of said guide tube adjoining said end of the respective longitudinal beam member, and a hydraulic piston-and-cylinder shock-absorber movably mounted within each guide tube substantially parallel to the respective longitudinal beam member with a piston rod connected at one end to the piston of said shock-absorber and connected at the other end to the closed end of the respective guide tube; flange means mounted on the end of the cylinder of each shock-absorber remote from the guide tube; and resiliently-mounted connection means securing each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member.

8. An energy-absorbing bumper bar arrangement for a motor vehicle having a base incorporating two beam members, each of which extends longitudinally of the vehicle substantially parallel to the longitudinal axis of said vehicle, said energy-absorbing bumper bar arrangement including a composite substantially box-section bumper bar comprising an outer channel-section member, and an inner channel-section member nested within said outer channel-section member, the peripheral edge of said inner member being secured to the corresponding peripheral edge of said outer member; energy-absorbing means comprising two open-ended guide tubes each of which is secured in parallel relationship with one of the longitudinal beam members adjacent an end thereof, with the open end of said guide tube adjoining said end of the respective longitudinal beam member, a shock-absorber means axially movably mounted within each guide tube substantially parallel to the respective longitudinal beam member and a plurality of resilient guide rings interposed between the shock-absorber means and said guide tube to allow limited radial movement of the shock-absorber means within said guide tube; flange means mounted on the end of each shock-absorber means remote from the guide tube; and resiliently-mounted connection means securing each flange means to said inner channel-section member in a zone extending at right angles to the longitudinal axis of said inner channel-section member, at least the major portion of each of said resiliently-mounted connection means being located inside the bumper bar between the outer channel-section member and the inner channel-section member.

9. An energy-absorbing bumper bar arrangement according to claim 8, in which the outer periphery of each guide ring is shaped with an annular groove therein so that only the outer radial edges of said guide ring are in contact with the guide tube.

* * * * *